US011400992B2

(12) United States Patent
Miyamoto et al.

(10) Patent No.: US 11,400,992 B2
(45) Date of Patent: Aug. 2, 2022

(54) WINDSCREEN DEVICE FOR SADDLED VEHICLE

(71) Applicant: HONDA MOTOR CO., LTD., Tokyo (JP)

(72) Inventors: Soichiro Miyamoto, Wako (JP); Tetsu Horiuchi, Wako (JP); Naoki Hara, Wako (JP); Shinji Kawasumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

(21) Appl. No.: 16/967,855

(22) PCT Filed: Feb. 28, 2018

(86) PCT No.: PCT/JP2018/007642
§ 371 (c)(1),
(2) Date: Aug. 6, 2020

(87) PCT Pub. No.: WO2019/167195
PCT Pub. Date: Sep. 6, 2019

(65) Prior Publication Data
US 2021/0046991 A1 Feb. 18, 2021

(51) Int. Cl.
*B62J 17/04* (2006.01)
*B60J 1/04* (2006.01)

(52) U.S. Cl.
CPC ...... *B62J 17/04* (2013.01); *B60J 1/04* (2013.01)

(58) Field of Classification Search
CPC .................................. B62J 17/04; B60J 1/04
See application file for complete search history.

(56) References Cited

U.S. PATENT DOCUMENTS

| 5,704,679 | A | 1/1998 | Sodo | |
|---|---|---|---|---|
| 10,766,557 | B2 * | 9/2020 | Tetsuka | E05F 15/695 |
| 2015/0266532 | A1 * | 9/2015 | Horiuchi | B62K 21/12 |
| | | | | 180/219 |

FOREIGN PATENT DOCUMENTS

| JP | H11-115854 | 4/1999 |
|---|---|---|
| JP | 2009-220615 | 10/2009 |
| JP | 2015-178341 | 10/2015 |

OTHER PUBLICATIONS

Japanese Office Action with English translation dated Sep. 14, 2021, 6 pages.

(Continued)

*Primary Examiner* — D Glenn Dayoan
*Assistant Examiner* — Melissa Ann Bonifazi
(74) *Attorney, Agent, or Firm* — Rankin, Hill & Clark LLP (57) ABSTRACT

A windscreen device for a saddled vehicle, according to which a height of a windscreen is adjustable according to a body frame or preference of a user, and according to which support stiffness for the windscreen can be secured and a windscreen support section can be miniaturized. Up-down movement of the windscreen is operated with a screen raising/lowering switch provided on a vehicle body side. A windscreen device includes a base member provided on the vehicle body side to guide the up-down movement of the windscreen, and a slider provided on the windscreen side to be slidably engaged with the base member. A rack is provided on one of the base member and the slider, and an electric motor for rotating a pinion that is meshed with the rack is provided on the other.

11 Claims, 12 Drawing Sheets

(56) References Cited

OTHER PUBLICATIONS

Indian Office Action dated May 28, 2021, 5 pages.
International Preliminary Report on Patentability dated Sep. 3, 2020, 5 pages.
International Search Report, dated Jan. 5, 2018, 2 pages.
Written Opinion of the International Searching Authority dated Apr. 23, 2018 filed in PCT/JP2018/007642, 5 pages.
International Preliminary Report on Patentability (PCT/IPEA/409), 8 pages.

* cited by examiner

WINDSCREEN DEVICE FOR SADDLED VEHICLE

TECHNICAL FIELD

The present invention relates to a windscreen device for a saddled vehicle.

BACKGROUND ART

Conventionally, a technology is known with respect to a windscreen that is provided at a front portion of a motorcycle, according to which the windscreen is freely movable in an up-down direction, and according to which a wiper is attached to the windscreen, and the wiper is moved in the up-down direction together with the windscreen (for example, see Patent Literature 1).

According to the technology, a downward stroke of the windscreen supporting a front edge portion of a foldable roof is made great, and an up-down movement mechanism of the wiper is simplified.

CITATION LIST

Patent Literature

Patent Literature 1: Japanese Patent Laid-Open No. H11-115854

SUMMARY OF INVENTION

Technical Problem

According to Patent Literature 1, although the windscreen is driven by a motor, an upper limit position of the windscreen is limited by a roof, and thus, adjustment of a height of the windscreen according to a body frame or preference of a driver is restricted. Furthermore, because the windscreen meets wind resistance, support stiffness for the windscreen has to be secured, but if the support stiffness is simply increased, a size of a windscreen support section is possibly increased.

An aspect of the present invention is aimed at providing a windscreen device for a saddled vehicle, according to which a height of a windscreen is adjustable according to a body frame or preference of a user, and according to which support stiffness for the windscreen can be secured and a windscreen support section can be miniaturized.

Solution to Problem

To solve the problems described above, an aspect of the present invention is a windscreen device for a saddled vehicle, the windscreen device including, at a front portion of a vehicle body, a windscreen (93) that is movable up and down, where the windscreen (93) is made of resin, and up-down movement of the windscreen (93) is operated with a switch (106) provided on a vehicle body side, a guide member (81) provided on the vehicle body side to guide the up-down movement of the windscreen (93), and a slider (91) provided on a side of the windscreen (93) so as to be engaged with the guide member (81) in a slidable manner are included, and a rack (101) extending in an up-down direction is provided on one of the guide member (81) and the slider (91), and a motor (87) for rotating a pinion (89) that is meshed with the rack (101) is provided on the other one of the guide member (81) and the slider (91).

According to an aspect of the present invention, the slider (91) and the windscreen (93) may be fastened together by a fastening section (97), and the fastening section (97) may include a screen support member (92) that is disposed between the windscreen (93) and the slider (91), a first fastening member (95A) for fastening the screen support member (92) to the slider (91), and a second fastening member (95B) for fastening the windscreen (93) to the screen support member (92).

Furthermore, according to an aspect of the present invention, the windscreen (93) may be moved up or down by pressing of the switch (106) provided on a handle (33).

Furthermore, according to an aspect of the present invention, a stopper device (125) for restricting a movable region of the windscreen (93) may be included, and movement of the windscreen (93) may be stopped when the stopper device (125) and the rack (101) come into contact with each other.

Furthermore, according to an aspect of the present invention, the motor (87) may be provided behind the guide member (81) in a vehicle front-side view, and in a state where the windscreen (93) is lowered, the motor (87) may be disposed partially overlapping the screen support member (92), in a manner extending from a vehicle center side toward an outer side in a vehicle width direction.

Advantageous Effects of Invention

According to an aspect of the present invention, the windscreen is made of resin, and up-down movement of the windscreen is operated with the switch provided on a vehicle body side, the guide member provided on the vehicle body side to guide the up-down movement of the windscreen, and the slider provided on a side of the windscreen so as to be engaged with the guide member in a slidable manner are included, and the rack extending in the up-down direction is provided on one of the guide member and the slider, and the motor for rotating the pinion that is meshed with the rack is provided on the other, and thus, the windscreen may be moved up or down according to a body frame or preference of a user, by operation of the switch provided on the vehicle body side. Ease of use of the windscreen device may thereby be increased.

According to an aspect of the present invention, the slider and the windscreen are fastened together by the fastening section, and the fastening section includes the screen support member that is disposed between the windscreen and the slider, the first fastening member for fastening the screen support member to the slider, and the second fastening member for fastening the windscreen to the screen support member, and thus, because the screen support member is provided, support stiffness for the windscreen may be increased, and also, in a case where a plurality of first fastening members are included, a gap between the first fastening members may be reduced, and a total length of the slider may be reduced. The guide member may thus be miniaturized, thereby enabling the windscreen device to be miniaturized.

Furthermore, according to an aspect of the present invention, the windscreen is moved up or down by pressing of the switch provided on the handle, and ease of use of the windscreen device may thus be increased.

Furthermore, according to an aspect of the present invention, the stopper device for restricting a movable region of the windscreen is included, and movement of the windscreen is stopped when the stopper device and the rack come into contact with each other, and thus, because the stopper device is provided, the need for detecting an output signal of the motor and restricting the movable region may be eliminated, and there is no need to provide a separate circuit board for detection of the output signal of the motor, and the cost may be reduced.

Furthermore, according to an aspect of the present invention, the motor is provided behind the guide member in a vehicle front-side view, and in a state where the windscreen is lowered, the motor is disposed partially overlapping the screen support member, in a manner extending from a vehicle center side toward an outer side in a vehicle width direction, and thus, the motor may be compactly disposed, and also, the windscreen device may be miniaturized.

DESCRIPTION OF EMBODIMENT

Hereinafter, an embodiment of the present invention will be described with reference to the drawings. Additionally, in the description, directions such as front, back, left, right, up and down are the same as directions relative to a vehicle body, unless specified otherwise. Furthermore, reference signs FR, UP, and LH shown in the drawings indicate a front side of the vehicle body, an upper side of the vehicle body, and a left side of the vehicle body, respectively.

Figure 1:
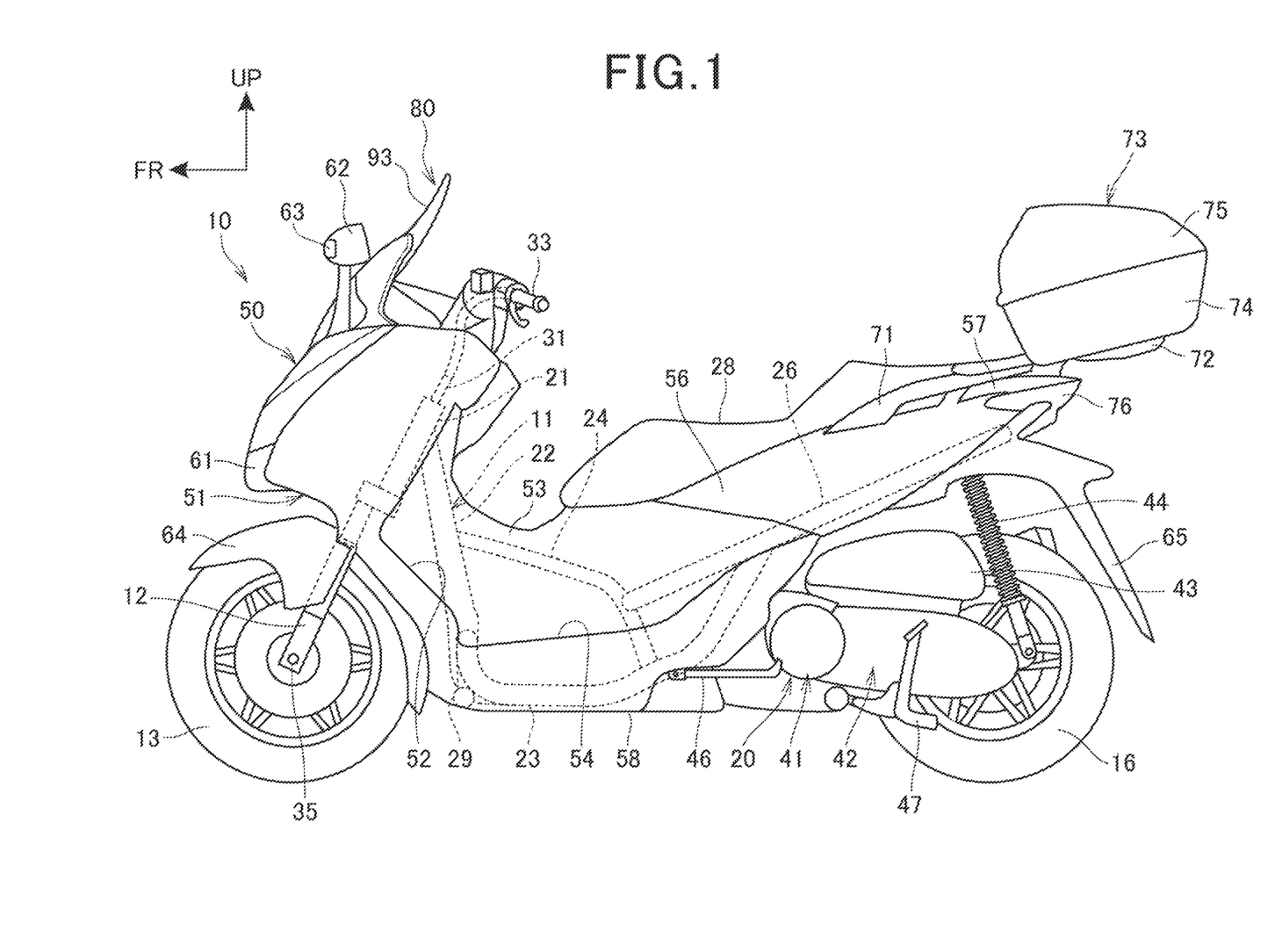
FIG. 1 is a left side view showing a motorcycle provided with a windscreen device according to the present invention.

FIG. 1 is a left side view showing a motorcycle 10 provided with a windscreen device 80 according to the present invention.

The motorcycle 10 is a scooter-type saddled vehicle including a front wheel 13 that is supported on a front end portion of a vehicle body frame 11 by a front fork 12, and a rear wheel 16 that is supported on a lower portion of the vehicle body frame 11 by a power unit 20.

The vehicle body frame 11 includes a head pipe 21, a down frame 22, a pair of left and right lower frames 23, a pair of left and right upper frames 24, and a pair of left and right rear frames 26.

The head pipe 21 is disposed on the front end portion of the vehicle body frame 11, and supports the front fork 12 while allowing steering of the front fork 12. The down frame 22 extends downward from the head pipe 21, and a lower end portion of the down frame 22 is connected to a lower cross pipe 29 extending in a vehicle width direction. The left and right lower frames 23 extend downward from left and right of a lower portion of the down frame 22, and then extend rearward and then rearward and obliquely upward. Parts, of front portions of the left and right lower frames 23, extending in a front-back direction are disposed, respectively, below left and right step floors 54, which will be described later in detail. End portions of the lower cross pipe 29 are attached to front lower portions of the left and right lower frames 23.

The left and right upper frames 24 extend rearward and obliquely downward from left and right mid-portions of the down frame 22, and then bend downward and obliquely rearward to be connected to the left and right lower frames 23, respectively. The left and right rear frames 26 extend rearward and obliquely upward from bent portions of the left and right upper frames 24, and support a storage box 27 (not shown). A tandem seat 28 where a driver and a passenger are to be seated is attached to an upper portion of the storage box.

Rear end portions of the left and right lower frames 23 are connected to mid-portions of the left and right rear frames 26.

The front fork 12 includes a steering stem 31 that is rotatably supported on the head pipe 21, and a handle 33 is attached to upper end portion of the steering stem 31. Furthermore, the front wheel 13 is supported on a lower end portion of the front fork 12 by an axle 35.

The power unit 20 includes a water-cooling engine 41 that is supported on the lower portion of the vehicle body frame 11 by a pivot shaft (not shown) in a manner capable of swinging up and down and that forms a front portion, and a continuously variable transmission 42 that is integrally provided on a rear portion of the engine 41. An output shaft (not shown) is provided on a rear end portion of the continuously variable transmission 42, the rear wheel 16 is attached to the output shaft, and the rear wheel 16 is driven by the power unit 20. An air cleaner 43 constituting an intake device of the engine 41 is provided on an upper portion of the power unit 20.

A rear cushion unit 44 spans between the rear end portion of the continuously variable transmission 42 and a rear portion of the vehicle body frame 11.

A side stand 46 is attached to the lower portion of the vehicle body frame 11, and a main stand 47 is attached to a bottom portion of the power unit 20.

The vehicle body frame 11 is covered by a vehicle body cover 50. The vehicle body cover 50 includes a front cover 51, a pair of left and right leg shields 52, a center cover 53, a pair of left and right step floors 54, a pair of left and right side covers 56, a rear center cover 57, and an under cover 58.

The front cover 51 covers a front side of a front portion of the vehicle body frame 11, and a front side and lateral sides of the front fork 12. A headlight 61 and a pair of left and right rear view mirrors 62 are provided on the front cover 51, and a front indicator 63 is disposed on each of the left and right rear view mirrors 62. Furthermore, the windscreen device 80 for enabling up-down movement of a windscreen 93 is provided on an upper portion of the front cover 51.

The left and right leg shields 52 extend from both side edges of the front cover 51 to an inner side in the vehicle width direction to cover legs of the driver from a front side. The center cover 53 is disposed on a rear side of the front fork 12 and covers a part between the left and right leg shields 52, and also extends to below the tandem seat 28. The left and right step floors 54 are parts where the driver places feet, and that extend rearward from lower end portions of the left and right leg shields 52. The left and right side covers 56 cover lower portions of both side portions of the tandem seat 28. The rear center cover 57 connects rear end portions of the left and right side covers 56. The under cover 58 covers a lower portion of the vehicle body.

The front wheel 13 is covered by a front fender 64 from above, and the rear wheel 16 is covered by a rear fender 65 from above.

A grab rail 71 to be gripped by a passenger is disposed in a manner surrounding both side portions and a rear portion of the tandem seat 28 at above the left and right side covers 56. A rear carrier 72 is attached to a rear portion of the grab rail 71, and a top box 73 for storing objects is attached to the rear carrier 72.

A tail light 76 is disposed below the rear center cover 57.

Figure 2:
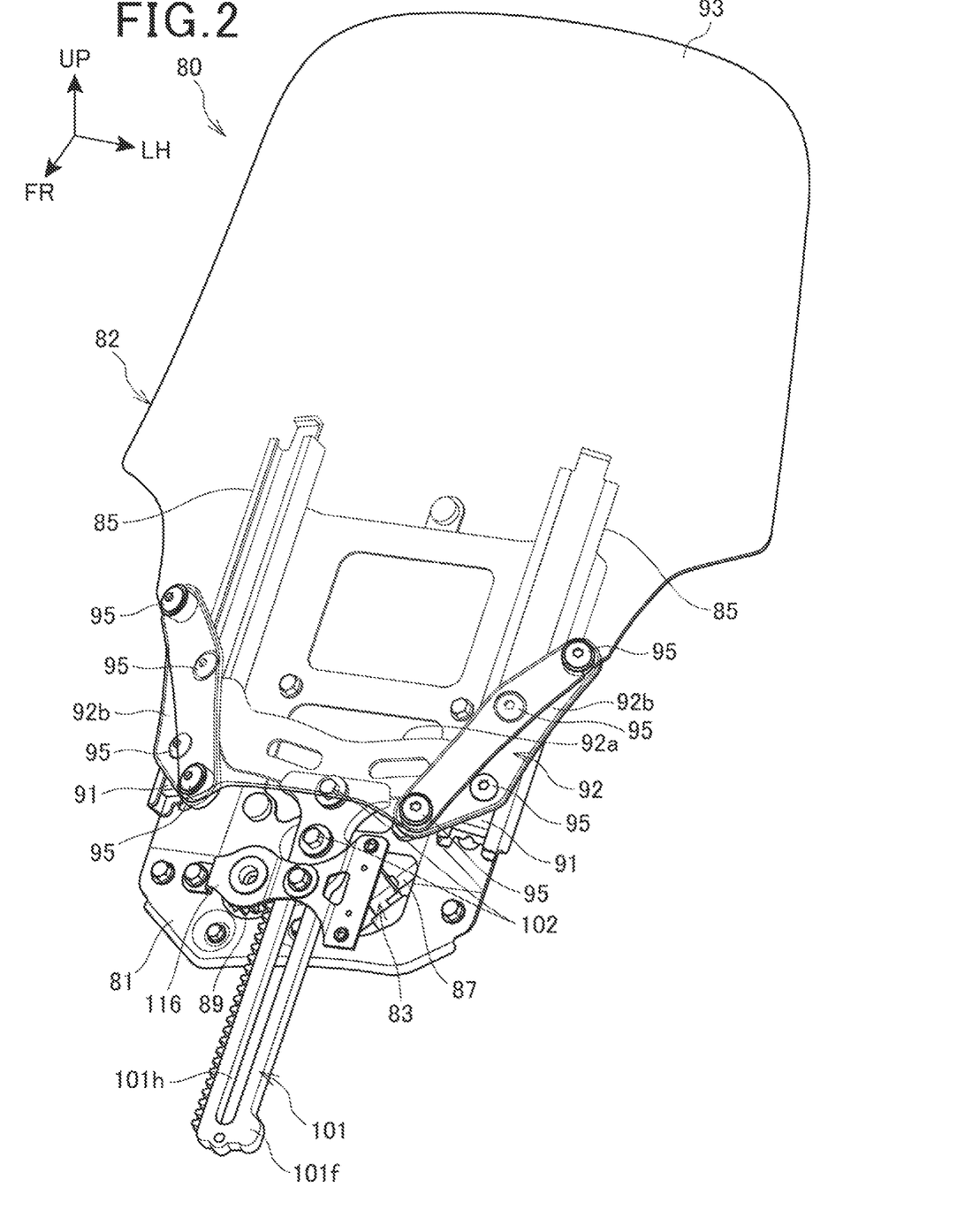
FIG. 2 is a perspective view showing a state where a movable section of the windscreen device is lowered to a lower limit position.
Figure 3:
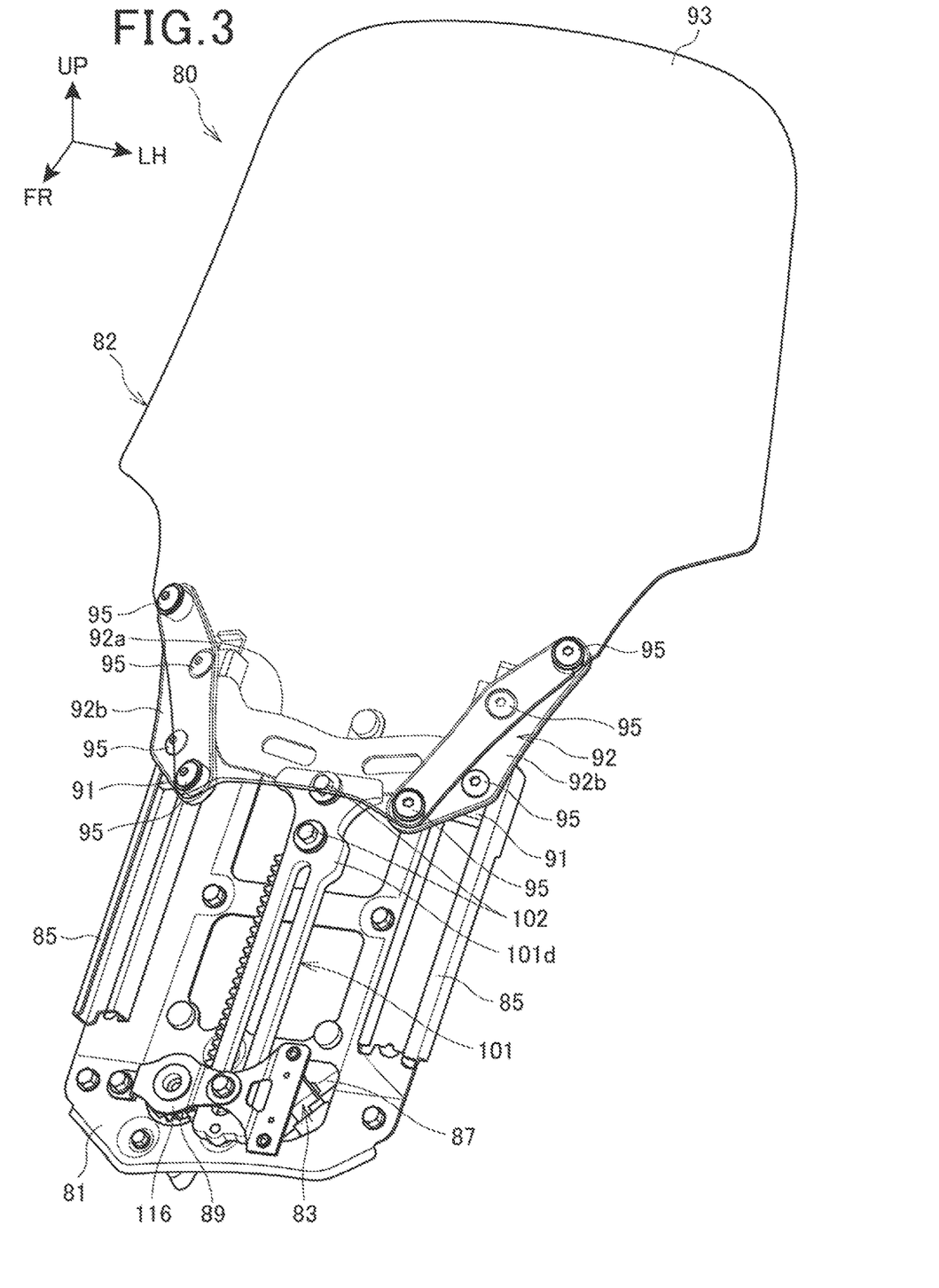
FIG. 3 is a perspective view showing a state where the movable section of the windscreen device is raised to an upper limit position.

FIG. 2 is a perspective view showing a state where a movable section 82 of the windscreen device 80 is lowered to a lower limit position, and FIG. 3 is a perspective view showing a state where the movable section 82 of the windscreen device 80 is raised to an upper limit position.

As shown in FIGS. 2 and 3, the windscreen device 80 includes a base member 81 provided on a side of the front cover 51 (see FIG. 1), the movable section 82 provided on the base member 81 in a manner capable of moving up and down, and a driving unit 83 for driving the movable section 82 relative to the base member 81.

The base member 81 is a plate-shaped member that is press-molded, and includes a pair of left and right rail sections 85 that extend in an up-down direction at left and right edge portions of the base member 81, and includes, on a rear surface side of the base member 81, an electric motor 87 constituting the driving unit 83.

The movable section 82 includes a pair of left and right sliders 91 that are slidably supported on the left and right rail sections 85, a screen support member 92 attached to the left and right sliders 91, and the windscreen 93 supported by the screen support member 92.

The screen support member 92 is formed by integrating a substantially horizontal center portion 92a that is positioned at a center, and a pair of left and right side portions 92b that extend upward and obliquely outward, and downward and obliquely inward from both ends of the center portion 92a.

The pair of left and right side portions 92b of the screen support member 92 are fastened to the left and right sliders 91, each with a plurality of fastening members 95, and also, left and right edge portions of a lower portion of the windscreen 93 are fastened to the pair of left and right side portions 92b, each with a plurality of fastening members 95.

A rack 101 extending downward is attached to the center portion 92a of the screen support member 92 with a plurality of bolts 102. The rack 101 constitutes a part of the movable section 82. A long opening 101h extending in a lengthwise direction of the rack 101 is formed in the rack 101.

As shown in FIGS. 2 and 3, by providing the driving unit 83 including the electric motor 87 on the side of the base member 81, the movable section 82 may be made light, and also, a space that is occupied at the time of up-down movement of the movable section 82 may be made small.

Figure 4:
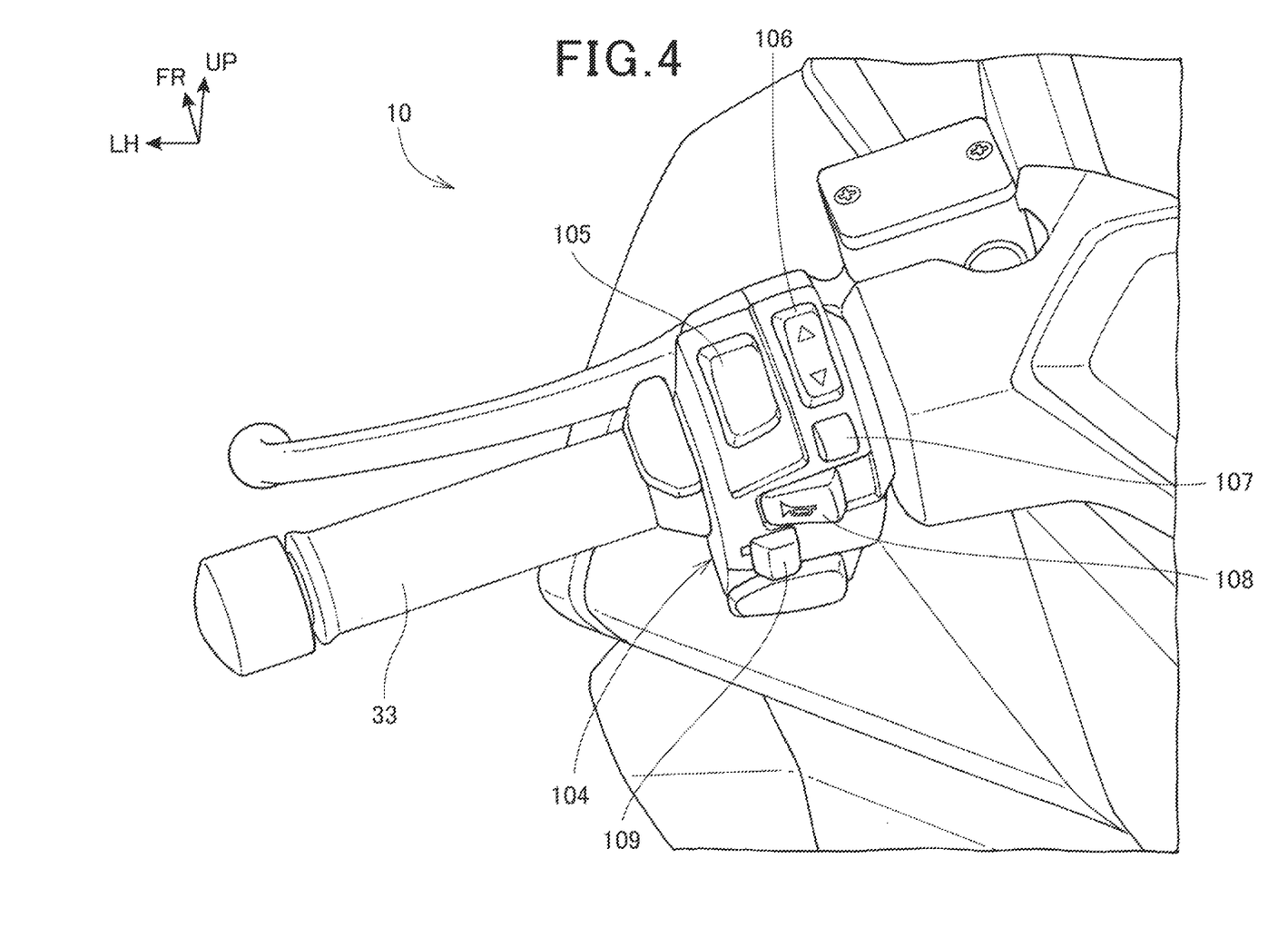
FIG. 4 is a perspective view showing a handle of the motorcycle, and a periphery of the handle.

FIG. 4 is a perspective view showing the handle 33 of the motorcycle 10, and a periphery of the handle 33.

A switch case 104 is provided on a side of one of left and right handles 33 (in this case, on the left side). A headlight beam switch 105, a screen raising/lowering switch 106, a hazard switch 107, a horn switch 108, and an indicator switch 109 are provided on the switch case 104.

The headlight beam switch 105 is used at the time of switching between a passing beam (low beam) and a driving beam (high beam) of the headlight 61 (see FIG. 1). The screen raising/lowering switch 106 is pressed to activate the electric motor 87 of the windscreen device 80 shown in FIGS. 2 and 3 to raise or lower the movable section 82.

In FIG. 4, the headlight beam switch 105 and the screen raising/lowering switch 106 are disposed on an upper portion of the switch case 104, and the screen raising/lowering switch 106 is disposed beside (or more specifically, on an inward side of) the headlight beam switch 105.

The hazard switch 107 is used to flash a hazard light, and the screen raising/lowering switch 106 is disposed above the hazard switch 107. The horn switch 108 is used to sound a horn. The indicator switch 109 is used to flash an indicator.

Figure 5:
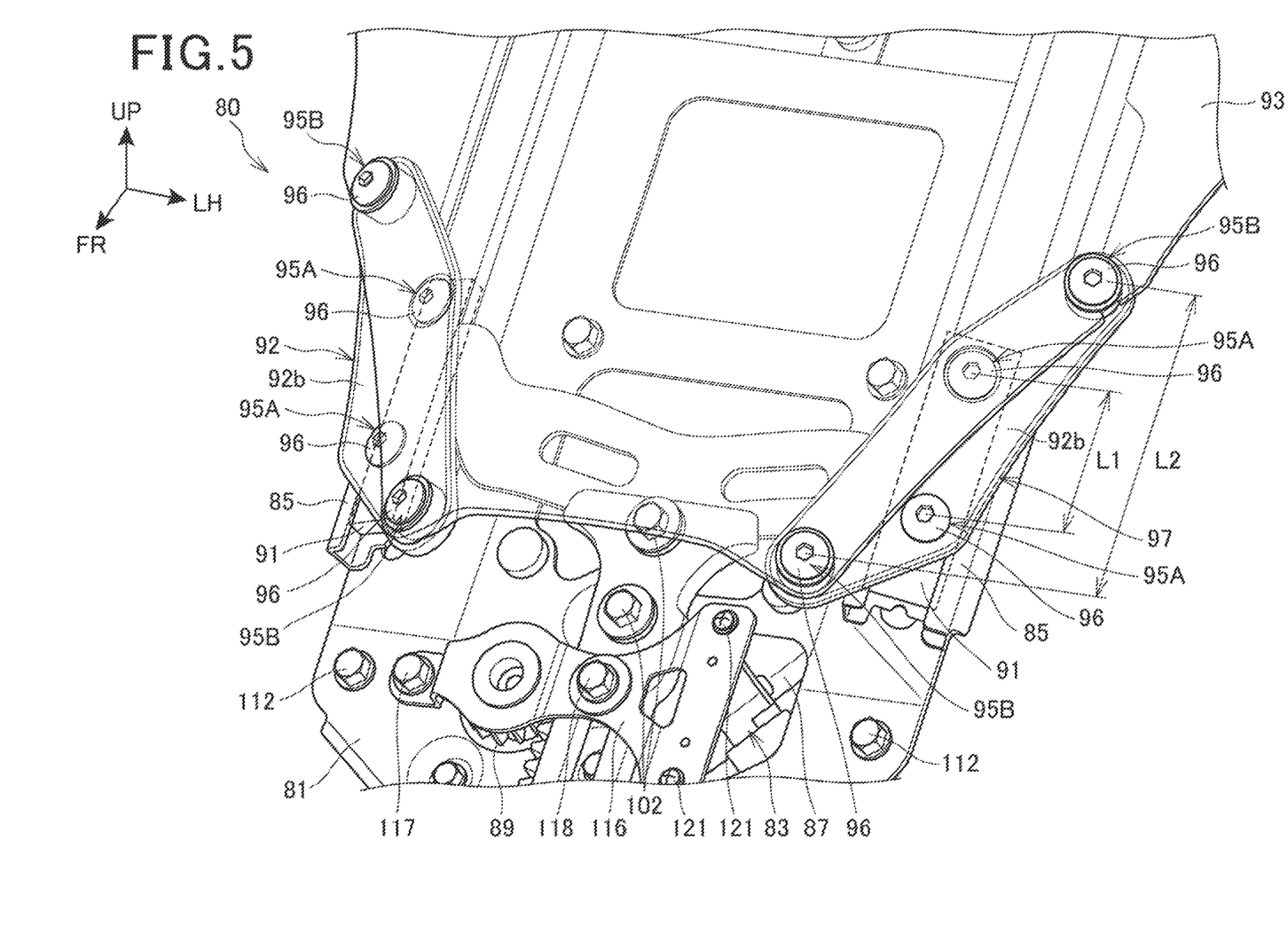
FIG. 5 is a perspective view showing main parts of the windscreen device.

FIG. 5 is a perspective view showing main parts of the windscreen device 80.

The left and right sliders 91 are each formed into a rectangular plate shape, with a lengthwise direction of the rectangle extending along a lengthwise direction of the rail section 85, and the left and right sliders 91 are fitted in the left and right rail sections 85 in a slidable manner.

The side portion 92b of the screen support member 92 is fastened to a corresponding one of the left and right sliders 91 with a pair of upper and lower fastening members 95A (the fastening members 95A are the same as the fastening members 95 (see FIG. 2), but different reference signs are used here to enable identification). The upper fastening member 95A is disposed behind the windscreen 93, and the lower fastening member 95A at least partially does not overlap the windscreen 93 in a front-back direction.

Furthermore, the left and right edge portions of the lower portion of the windscreen 93 are fastened to the screen support member 92, each with a pair of upper and lower fastening members 95B (the fastening member 95B are the same as the fastening members 95 (see FIG. 2), but different reference signs are used here to enable identification). The fastening members 95, 95A, 95B are each formed from a screw 96 and a nut (not shown) where the screw 96 is to be screwed into.

The screen support member 92 and the fastening members 95A, 95B form a fastening section 97 for fastening the sliders 91 and the windscreen 93 together. As described above, the screen support member 92 is attached to the slider 91 with a pair of fastening members 95A, and the windscreen 93 is attached to the screen support member 92 with a pair of fastening members 95B different from the fastening members 95A. Accordingly, a gap L1 between the pair of fastening members 95A in the up-down direction may be made smaller, and also, a gap L2 between the pair of fastening members 95B in the up-down direction may be made greater.

If the gap L1 is made small, a total length of the slider 91 may be reduced, and a total length of the left and right rail sections 85 may thus be reduced, and reduction in size and weight of the windscreen device 80 may be achieved. Furthermore, if the gap L2 is increased, support stiffness with which the screen support member 92 supports the windscreen 93 may be increased.

As described above, the slider 91 and the windscreen 93 are fastened together by the fastening section 97, and the fastening section 97 includes the screen support member 92, the fastening members 95A as first fastening members, and the fastening members 95B as second fastening members.

The screen support member 92 is disposed between the windscreen 93 and the slider 91. The fastening members 95A fasten the screen support member 92 to the slider 91. The fastening members 95B fasten the windscreen 93 to the screen support member 92.

According to such a configuration, by providing the screen support member 92, the support stiffness for the windscreen 93 may be increased, and also, in a case where a plurality of fastening members 95A are provided, the gap between the fastening members 95A may be reduced, and the total length of the slider 91 may be reduced. The base member 81 may thus be miniaturized, thereby enabling the windscreen device 80 to be miniaturized.

Figure 6:
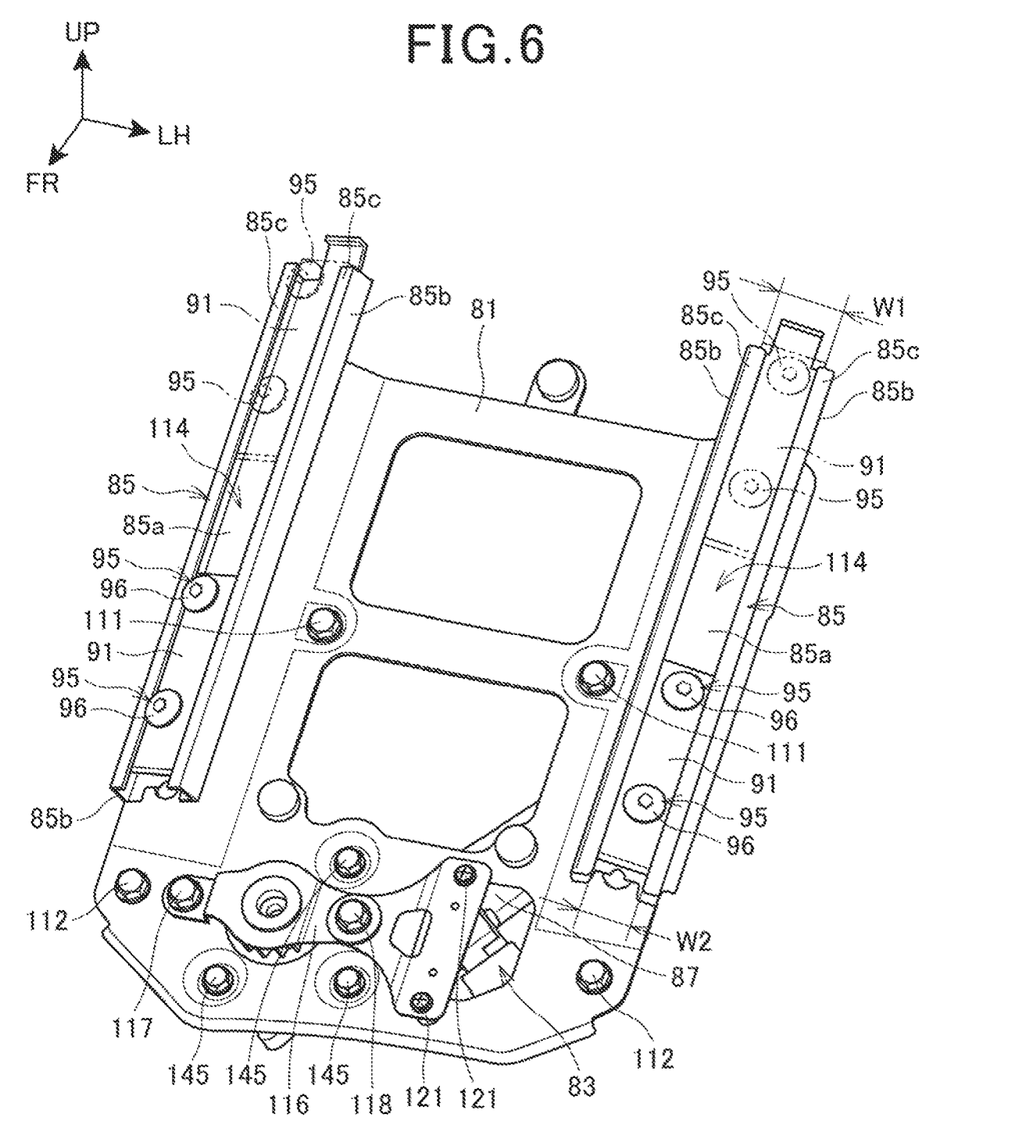
FIG. 6 is a perspective view showing a base member and a driving unit.

FIG. 6 is a perspective view showing the base member 81 and the driving unit 83.

The base member 81 is attached to an inner side of the front cover 51 (see FIG. 1) with a pair of left and right bolts 111 that are disposed between the left and right rail sections 85 and a pair of left and right bolts 112 that are disposed below the left and right rail sections 85. The rail section 85 is formed by integrating a bottom wall 85a, a pair of side walls 85b, and a pair of upper walls 85c.

The bottom wall 85a is attached to a front surface of each of left and right side edge portions of the base member 81, and the pair of side walls 85b are raised from left and right edges of the bottom wall 85a. Furthermore, the upper walls 85c extend from front edges of the pair of side walls 85b, toward facing side walls 85b. A space 114 having a width W2 smaller than a width W1 of the slider 91 is provided between the pair of upper walls 85c. The slider 91 may thereby slide inside the rail section 85 without falling forward off the rail section 85. The screws 96 of the fastening members 95 are disposed in the space 114.

A lower cover 116 for covering the driving unit 83 and a stopper device 125 (see FIG. 7), which will be described later in detail, from the front side is attached to a lower portion of the base member 81 with a pair of left and right bolts 117, 118 and a pair of upper and lower screws 121.

Figure 7:
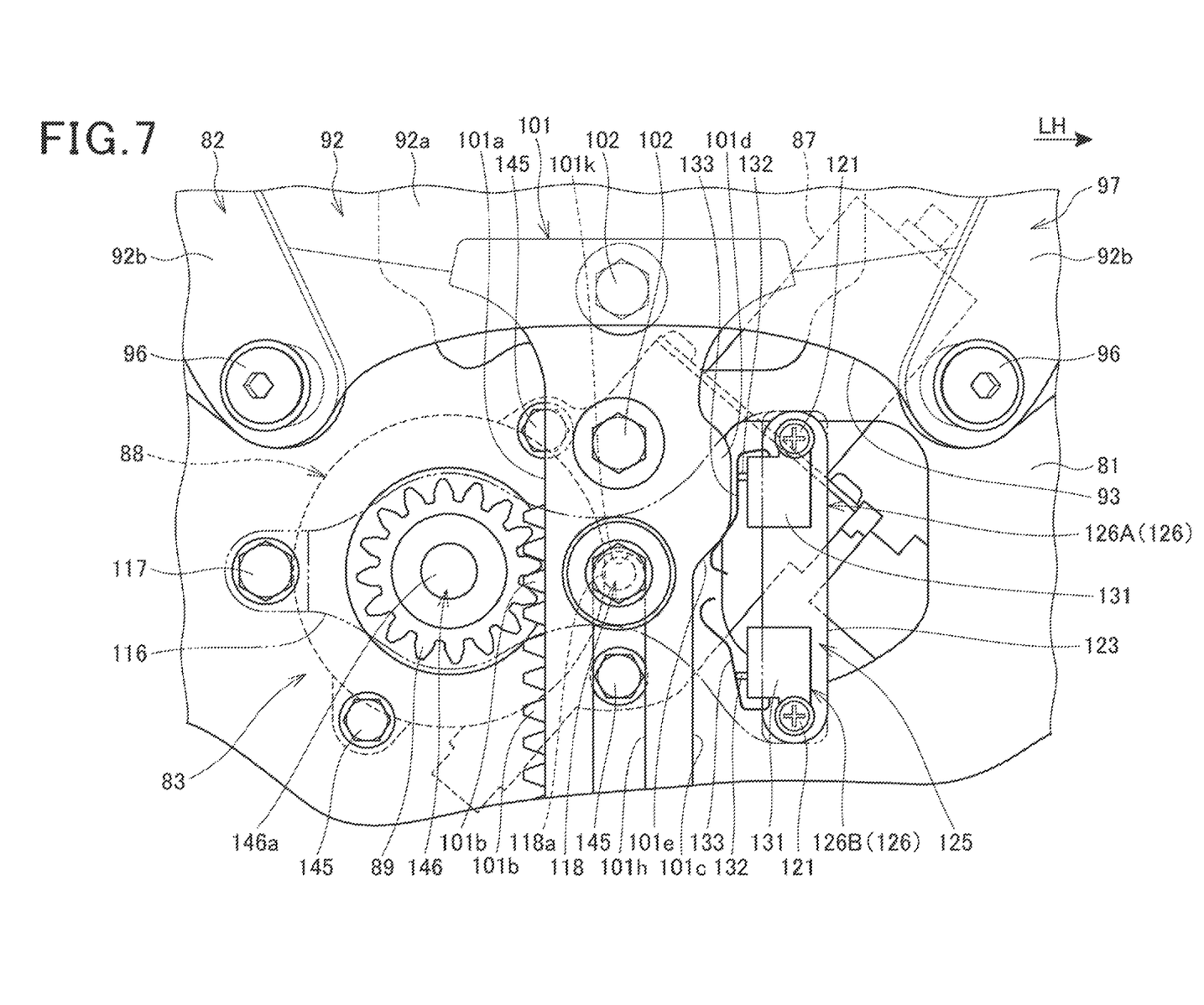
FIG. 7 is a front view showing the driving unit, a stopper device, and a periphery of the two.

FIG. 7 is a front view showing the driving unit 83, the stopper device 125, and a periphery of the two.

The driving unit 83 includes the electric motor 87, and a pinion 89 that is rotatably provided at the electric motor 87 via a reduction device 149 (see FIG. 8), which will be described later in detail.

At the lower limit position of the movable section 82, the electric motor 87 and a part of the fastening section 97 (or more specifically, the screen support member 92) overlap each other in a front view and a vehicle front-side view.

The pinion 89 is meshed with a plurality of teeth 101b formed on an end surface 101a of one side (right side) of the rack 101.

The stopper device 125 that is attached to the base member 81 via a support plate 123 is disposed on an opposite side of the rack 101 from the pinion 89.

The stopper device 125 includes a pair of position detection switches 126 for detecting a lower limit position and an upper limit position of the rack 101. The pair of position detection switches 126 are fastened, together with the support plate 123, to the base member 81 with the pair of screws 121.

The position detection switch 126 includes a housing 131, a detector 132 protruding from one end surface of the housing 131, and a lever 133, one end of which is swingably attached to the housing 131. When the lever 133 swings by coming into contact with a part of the rack 101 and pushes the detector 132, a movable contact in the housing 131 moves away from a fixed contact, and the position detection switch 126 is switched off.

Here, for the sake of convenience, the pair of position detection switches 126 will be given as a lower limit position detection switch 126A for detecting the lower limit position of the rack 101, and an upper limit position detection switch 126B for detecting the upper limit position of the rack 101.

As described above, the pinion 89 and the stopper device 125 are disposed on both sides of the rack 101 in the vehicle width direction. Accordingly, the teeth 101b to be meshed with the pinion 89 are provided on the end surface 101a of one side of the rack 101, and protruding portions 101d, 101f (see FIG. 10 for the protruding portion 101f) that are to come into contact with the stopper device 125 are provided on an end surface 101c of the other side of the rack 101. The rack 101 may thus be effectively used compared to a case of providing the teeth 101b and the protruding portions 101d, 101f on a different member, and cost may be reduced.

Furthermore, because the pinion 89 and the stopper device 125 are disposed next to each other in the vehicle width direction, the movable section 82 may be brought close to both the pinion 89 and the stopper device 125 in FIG. 2, when the movable section 82 is lowered. As a result, a movable range of the movable section 82 may be further increased.

As shown in FIGS. 1, 2, 4, and 7 described above, the windscreen device 80 of the motorcycle 10 as a saddled vehicle includes the windscreen 93 that is provided at the front portion of the vehicle body and that is movable up and down.

The windscreen 93 is made of resin, and up-down movement of the windscreen 93 is operated with the screen raising/lowering switch 106 as a switch that is provided on the vehicle body side.

The windscreen device 80 includes the base member 81 as a guide member that is provided on the vehicle body side to guide the up-down movement of the windscreen 93, and the slider 91 that is provided on the windscreen 93 side so as to be engaged with the base member 81 in a slidable manner.

The rack 101 extending in the up-down direction is provided on one of the base member 81 and the slider 91, and the electric motor 87 as a motor for rotating the pinion 89 that is meshed with the teeth 101b of the rack 101 is provided on the other.

According to such a configuration, the windscreen 93 may be easily moved up and down according to a body frame or preference of the user by operation of the screen raising/lowering switch 106 provided on the vehicle body side. Ease of use of the windscreen device 80 may thereby be increased.

Figure 8:
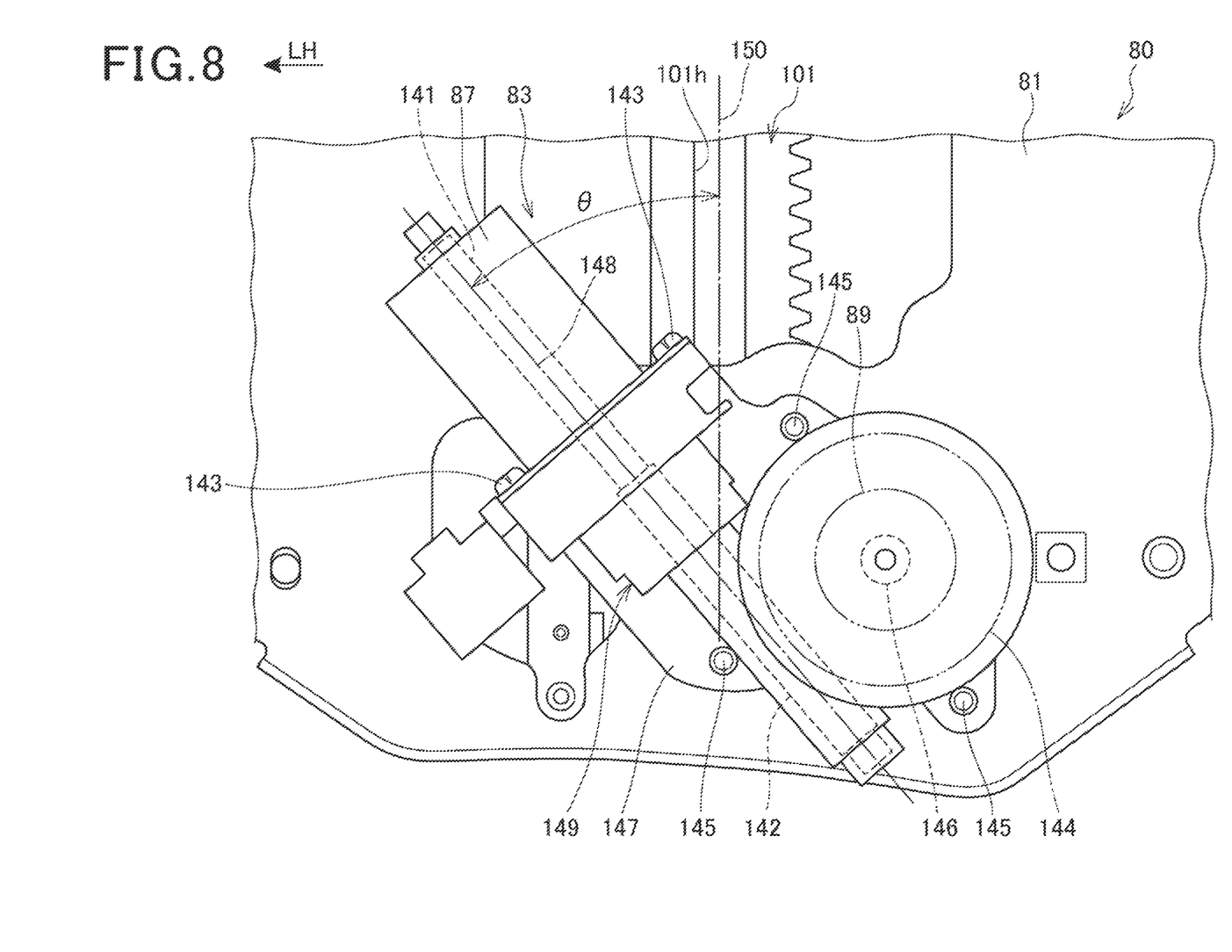
FIG. 8 is a rear view showing the driving unit provided on a rear surface of the base member.
Figure 9:
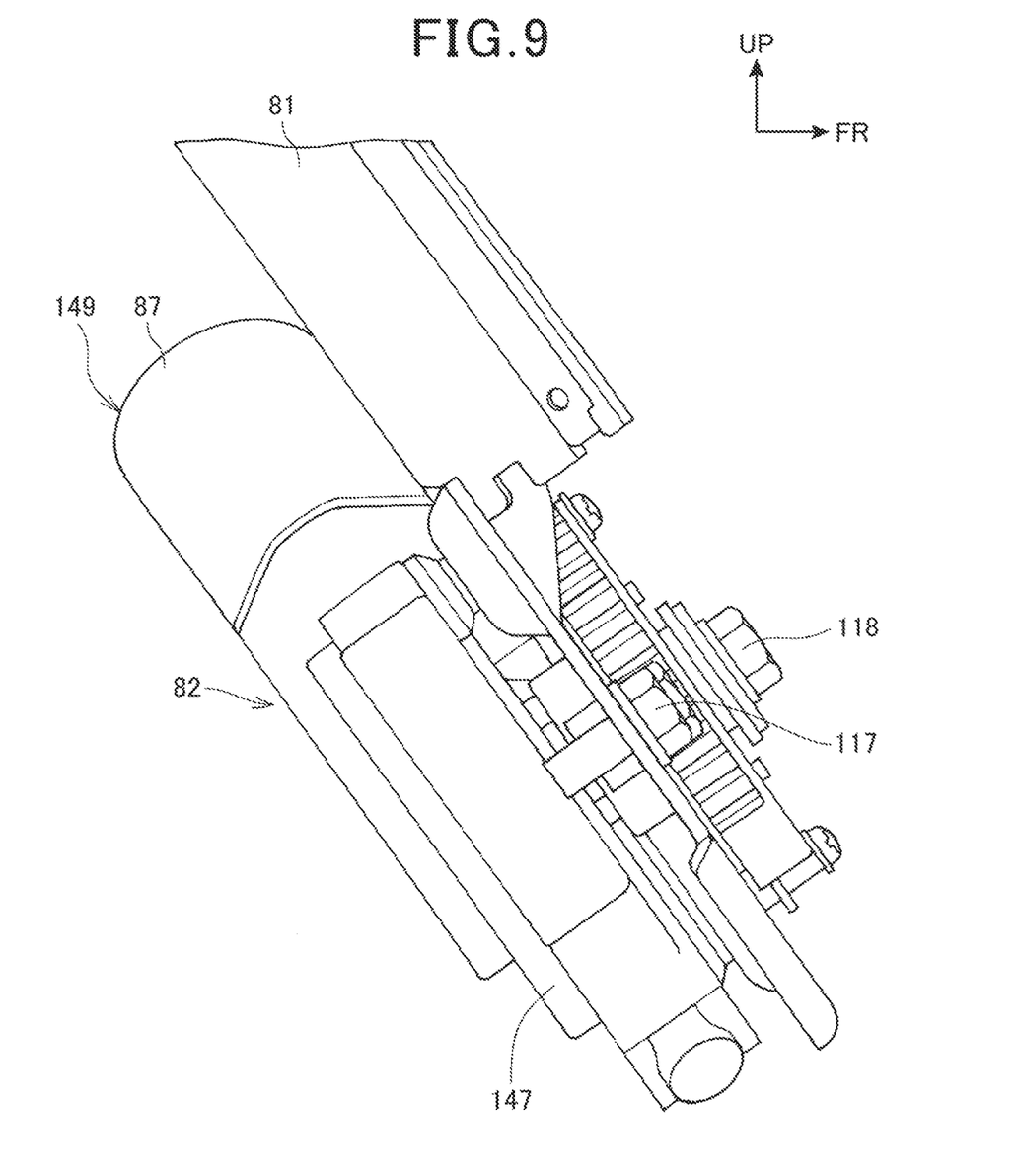
FIG. 9 is a side view showing the driving unit provided on the rear surface of the base member.

FIG. 8 is a rear view showing the driving unit 83 provided on a rear surface of the base member 81, and FIG. 9 is a side view showing the driving unit 83 provided on the rear surface of the base member 81.

As shown in FIG. 8, the driving unit 83 is formed from the electric motor 87, the pinion 89, and the reduction device 149. The reduction device 149 is formed from a shaft member 142, a reduction gear 144, a gear shaft 146, and a housing 147, and the electric motor 87 is attached to an end portion of the housing 147 with a plurality of screws 143.

The shaft member 142 is integrally connected to a rotary shaft 141 of the electric motor 87, and is provided on an extension line of the rotary shaft 141. The reduction gear 144 is meshed with a gear (not shown) formed on the shaft member 142. The gear shaft 146 supports the reduction gear 144. The housing 147 houses the shaft member 142, the reduction gear 144, and the gear shaft 146, and the shaft member 142 and the gear shaft 146 are rotatably supported on the housing 147. The gear shaft 146 includes, at an end portion, a protruding portion 146a (see FIG. 7) protruding outside from the housing 147, and the pinion 89 is attached to the protruding portion 146a.

The housing 147 is fixed to the base member 81 with a plurality of bolts 145.

An axis 148 of the rotary shaft 141 of the electric motor 87 and the shaft member 142 is inclined at an angle θ (0<θ<90°) with respect to a rack center line 150 extending in the up-down direction at a center of a width, in the vehicle width direction, of the opening 101h of the rack 101. The rack center line 150 is coincident or substantially coincident with a vehicle body center line extending in the up-down direction at a center of a vehicle width of the motorcycle 10 (see FIG. 1).

Due to such an inclination of the electric motor 87, the electric motor 87 may be effectively disposed on the base member 81, and the base member 81 may be made smaller, and thus, the windscreen device 80 may be miniaturized.

As shown in FIG. 9, the electric motor 87 and the housing 147 are disposed along the rear surface of the base member 81. By disposing most part of the driving unit 83 on and along the base member 81 in such a manner, the windscreen device 80 may be made thin, and a space on the vehicle that is occupied by the windscreen device 80 may be reduced. The vehicle may thus be miniaturized and be made compact.

As shown in FIGS. 7 and 8 described above, the electric motor 87 is provided behind the base member 81 in the vehicle front-side view. In a state where the windscreen 93 is lowered, the electric motor 87 is disposed partially overlapping the screen support member 92, in a manner extending from a vehicle center side (or in other words, the rack center line 150 side) toward an outer side in the vehicle width direction. According to such a configuration, the electric motor 87 may be compactly disposed, and also, the windscreen device 80 may be miniaturized.

Figure 10:
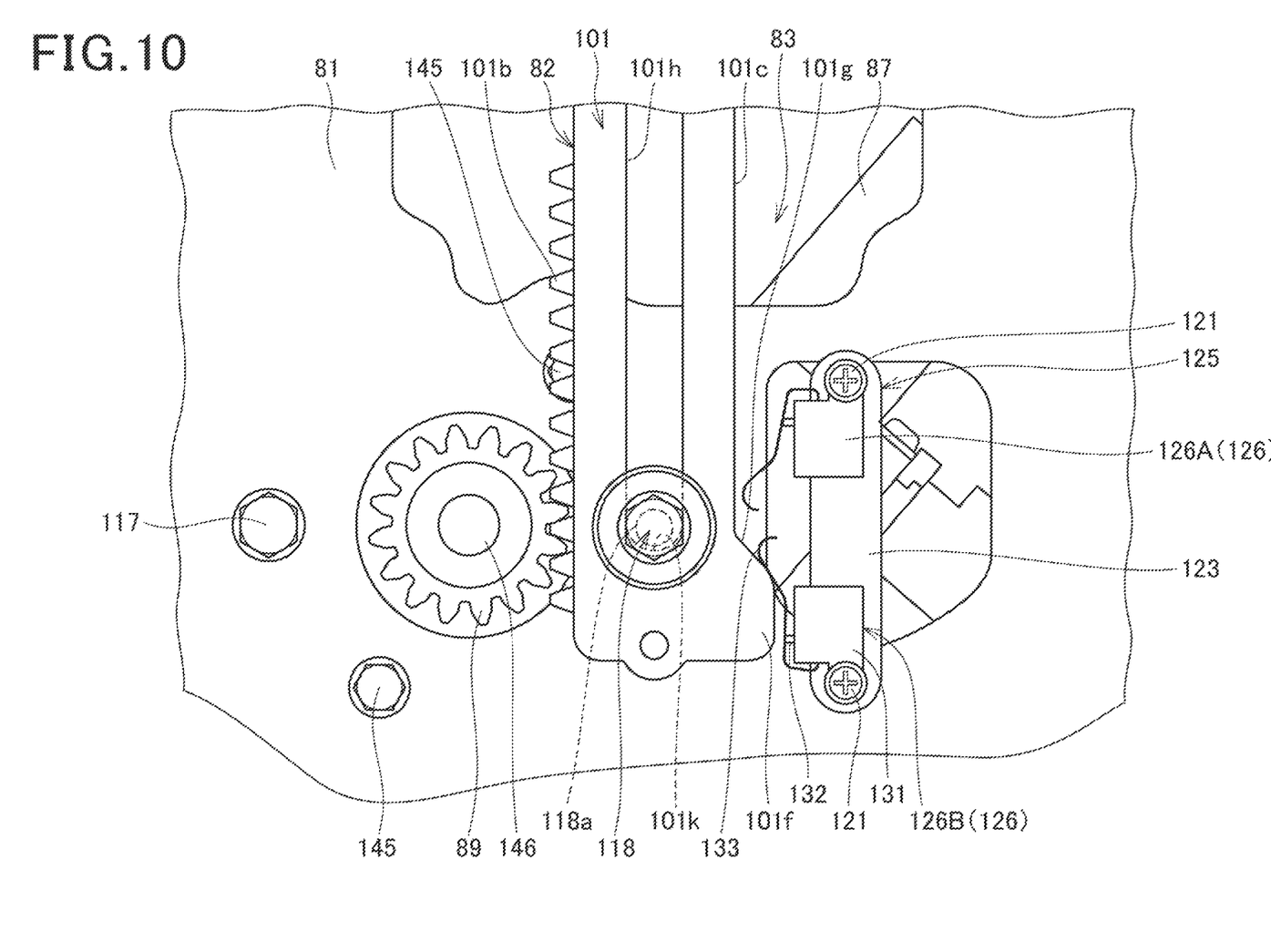
FIG. 10 is a front view showing the driving unit and the stopper device when the movable section is raised to the upper limit position.

FIG. 10 is a front view showing the driving unit 83 and the stopper device 125 when the movable section 82 is raised to the upper limit position.

FIG. 7 shows a state of the lower limit position detection switch 126A of the stopper device 125, where an inclined portion 101e of the protruding portion 101d provided on an upper part of the end surface 101c of the other side (left side) of the lowered rack 101 is in contact with the lever 133.

In this state, the lower limit position detection switch 126A is switched off, and the lower limit position of the rack 101, or in other words, the lower limit position of the movable section 82, is detected, and lowering of the movable section 82 is stopped. That is, the windscreen 93 stops at the lower limit position. When the screen raising/lowering switch 106 of the handle 33 shown in FIG. 4 is pressed on a raising side in this state, the windscreen 93 starts to be raised.

Furthermore, FIG. 10 shows a state of the upper limit position detection switch 126B of the stopper device 125, where an inclined portion 101a of the protruding portion 101f provided on a lower part of the end surface 101c of the other side (left side) of the raised rack 101 is in contact with the lever 133. In this state, due to the lever 133 being swung and the detector 132 being pushed, the upper limit position detection switch 126B is switched off, and the upper limit position of the rack 101, or in other words, the upper limit position of the movable section 82, is detected, and raising of the movable section 82 is stopped. That is, the windscreen 93 stops at the upper limit position. When the screen raising/lowering switch 106 of the handle 33 shown in FIG. 4 is pressed on a lowering side in this state, the windscreen 93 starts to be lowered.

In FIGS. 7 and 10, an upper end portion 101j and a lower end portion 101k of the opening 101h of the rack 101 are each formed into an arc shape. At the lower limit position and the upper limit position of the rack 101, the upper end portion 101j and the lower end portion 101k of the rack 101 are positioned away from a shaft portion 118a of the bolt 118. For example, in a case of failure of the lower limit position detection switch 126A, the upper end portion 101j of the rack 101 contacts the shaft portion 118a of the bolt 118, and lowering of the movable section 82 is stopped. Furthermore, in a case of failure of the upper limit position detection switch 126B, the lower end portion 101k of the rack 101 contacts the shaft portion 118a of the bolt 118, and raising of the movable section 82 is stopped.

As shown in FIGS. 7 and 10 described above, there is provided the stopper device 125 for restricting a movable region of the windscreen 93, and movement of the windscreen 93 is stopped when the stopper device 125 (or more specifically, the position detection switch 126) and the rack 101 come into contact with each other.

According to such a configuration, by providing the stopper device 125, the need for detecting an output signal of the motor or a rotation angle of the pinion and restricting the movable region may be eliminated, and thus, there is no need to provide a circuit or a substrate for detection of the output signal of the motor or the rotation angle of the pinion. Furthermore, because software for control is not necessary, the cost may be reduced.

Figure 11:
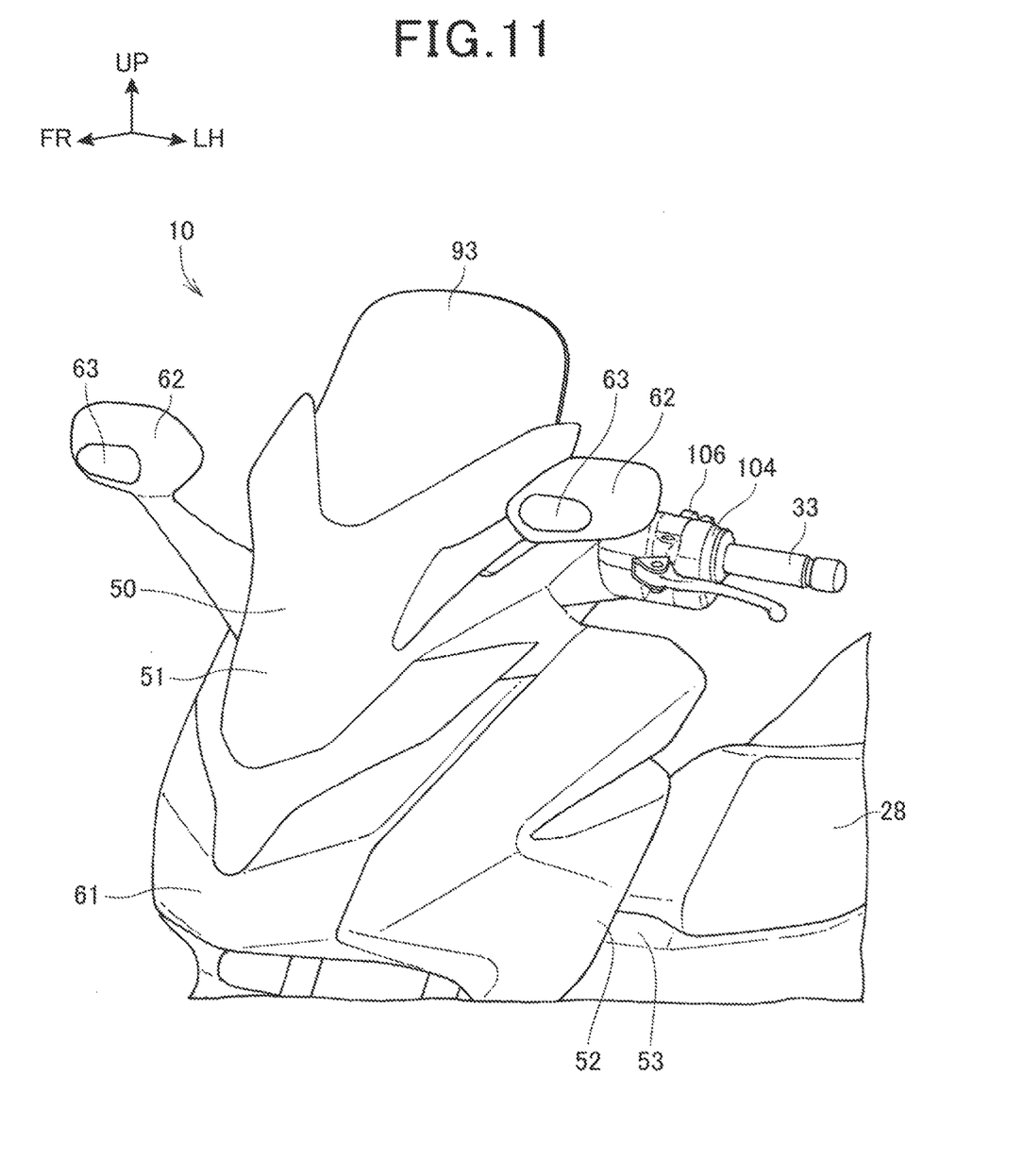
FIG. 11 is a perspective view of main parts of the motorcycle, the view showing a state where the windscreen is lowered to the lower limit position.
Figure 12:
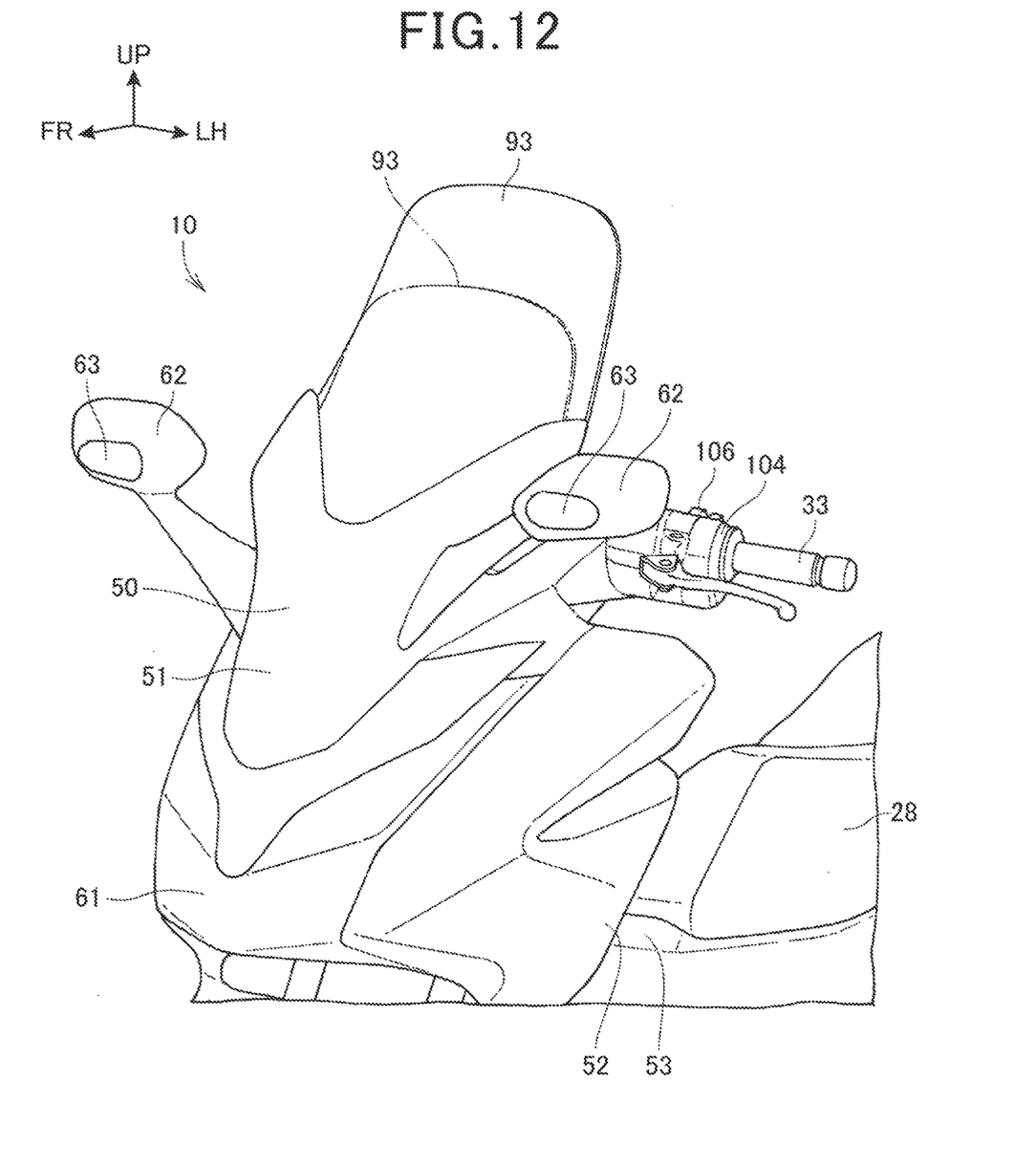
FIG. 12 is a perspective view of main parts of the motorcycle, the view showing a state where the windscreen is raised to the upper limit position.

FIG. 11 is a perspective view of main parts of the motorcycle 10, the view showing a state where the windscreen 93 is lowered to the lower limit position, and FIG. 12 is a perspective view of main parts of the motorcycle 10, the view showing a state where the windscreen 93 is raised to the upper limit position.

As shown in FIGS. 11 and 12, by operating the screen raising/lowering switch 106 on the switch case 104 provided on the handle 33, a height of the windscreen 93 may be easily adjusted to the lower limit position, the upper limit position, or any position between the lower limit position and the upper limit position.

For example, the height of the windscreen 93 may be changed according to a vehicle speed or an outside temperature at the time of traveling on the vehicle, and pressure of wind on a body may be adjusted.

In this manner, the windscreen 93 may be moved up or down according to the body frame or preference of the user, or the traveling state or a travel environment as described above, and user-friendliness of the motorcycle 10 (see FIG. 1) may be increased.

As described above, the windscreen 93 is moved up or down by pressing the screen raising/lowering switch 106 provided on the handle 33, and thus, the windscreen 93 may be easily raised or lowered. Accordingly, ease of use of the windscreen device 80 may be increased.

The embodiment described above is only an aspect of the present invention, and modifications and applications can be freely made within the scope of the present invention.

For example, in the embodiment described above, the rack 101 is provided on the movable section 82 side where the sliders 91 are provided, and the electric motor 87 is provided on the base member 81 side, as shown in FIG. 5, but such a case is not restrictive, and the electric motor 87 and the pinion 89 may be provided on the movable section 82 side, and the rack 101 may be provided on the base member 81 side.

The present invention is not limited to be applied to the motorcycle 10, and is applicable to saddled vehicles also including other than the motorcycle 10. Additionally, the saddled vehicles include any vehicle that a rider rides by straddling the vehicle body, and are vehicles including three-wheelers and four-wheelers which are categorized as all-terrain vehicles (ATV), in addition to the motorcycles (including motorized bicycles).

REFERENCE SIGNS LIST

10 motorcycle (saddled vehicle)
33 handle
80 windscreen device
81 base member (guide member)
87 electric motor (motor)
89 pinion
91 slider
92 screen support member
93 windscreen
95 fastening member
95A fastening member
95B fastening member
97 fastening section
101 rack
106 screen raising/lowering switch (switch)
125 stopper device

The invention claimed is:

1. A windscreen device for a saddled vehicle, the windscreen device including, at a front portion of a vehicle body, a windscreen that is movable up and down, wherein the windscreen is made of resin, and up-down movement of the windscreen is operated with a switch provided on a vehicle body side, a guide member provided on the vehicle body side to guide the up-down movement of the windscreen, and a slider provided on a side of the windscreen so as to be engaged with the guide member in a slidable manner are included, a rack extending in an up-down direction is provided on one of the guide member and the slider, and a motor for rotating a pinion that is meshed with the rack is provided on the other one of the guide member and the slider, a rotary shaft of the motor is, in a vehicle front-side view, inclined with respect to a center line extending in the up-down direction of the rack, and the pinion is disposed on one side beside the rack, and motor protrudes from a side edge of the rack, on another side.

2. The windscreen device for a saddled vehicle according to claim 1, wherein the slider and the windscreen are fastened together by a fastening section, and the fastening section includes a screen support member that is disposed between the windscreen and the slider, a first fastening member for fastening the screen support member to the slider, and a second fastening member for fastening the windscreen to the screen support member.

3. The windscreen device for a saddled vehicle according to claim 2, wherein the motor is provided behind the guide member in the vehicle front-side view, and in a state where the windscreen is disposed partially overlapping the screen support member, in a manner from a vehicle center side toward an outer side in a vehicle width direction.

4. The windscreen device for a saddled vehicle according to claim 1, wherein the windscreen is moved up and down by pressing of the switch provided on a handle.

5. The windscreen device for a saddled vehicle according to claim 1, wherein a stopper device for restricting a movable region of the windscreen is included, and movement of the windscreen is stopped when the stopper device and the rack come into contact with each other.

6. A windscreen device for a saddled vehicle, the windscreen device including, at a front portion of a vehicle body, a windscreen that is movable up and down, wherein
the windscreen is made of resin, and up-down movement of the windscreen is operated with a switch provided on a vehicle body side,
a guide member provided on the vehicle body side to guide the up-down movement of the windscreen, and slider provided on a side of the windscreen so as to be engaged with the guide member in a slidable manner are included,
a rack extending in an up-down direction is provided on one of the guide member and the slider, and a motor for rotating a pinion that is meshed with the rack is provided on the other one of the guide member and the slider, and
a stopper device for restricting a movable region of the windscreen is included, and movement of the windscreen is stopped when the stopper device and the rack come into contact with each other.

7. The windscreen device for a saddled vehicle according to claim 2, wherein the windscreen is moved up or down by pressing of the switch provided on a handle.

8. The windscreen device for a saddled vehicle according to claim 2, wherein a stopper device for restricting a movable region of the windscreen is included, and movement of the windscreen is stopped when the stopper device and the rack come into contact with each other.

9. The windscreen device for a saddled vehicle according to claim 3, wherein the windscreen is moved up or down by pressing of the switch provided on a handle.

10. The windscreen device for a saddled vehicle according to claim 3, wherein a stopper device for restricting a movable region of the windscreen is included, and movement of the windscreen is stopped when the stopper device and the rack come into contact with each other.

11. The windscreen device for a saddled vehicle according to claim 4, wherein a stopper device for restricting a movable region of the windscreen is included, and movement of the windscreen is topped when the stopper device and the rack come into contact with each other.

* * * * *